United States Patent [19]
Rippel

[11] Patent Number: 5,099,187
[45] Date of Patent: Mar. 24, 1992

[54] POWER CONNECT SAFETY AND CONNECTION INTERLOCK

[75] Inventor: Wally E. Rippel, Altadena, Calif.

[73] Assignee: California Institute of Technology, Pasadena, Calif.

[21] Appl. No.: 497,082

[22] Filed: Mar. 21, 1990

[51] Int. Cl.[5] .................... H02J 7/00; H01R 13/44
[52] U.S. Cl. ........................ 320/1; 307/246;
307/109; 307/135; 307/147; 361/187; 439/924; 439/133
[58] Field of Search ............. 307/10.7, 31, 38, 39,
307/246, 326–328, 100, 109, 130, 135, 147;
320/1; 361/1, 15–17, 58, 160, 170, 187, 188,
225; 323/908; 439/133, 135, 136, 305, 924

[56] References Cited

U.S. PATENT DOCUMENTS

| | | |
|---|---|---|
| 3,935,511 | 1/1976 | Boulanger et al. |
| 3,935,527 | 1/1976 | Michelet et al. |
| 4,031,559 | 6/1977 | Peters ............... 361/52 |
| 4,208,708 | 6/1980 | Abraham et al. ..... 363/57 |
| 4,405,975 | 9/1983 | Overstreet et al. ... 363/49 |
| 4,845,593 | 7/1989 | Brown et al. ....... 361/192 |
| 4,982,306 | 1/1991 | Koroncai et al. .... 361/58 |

*Primary Examiner*—A. D. Pellinen
*Assistant Examiner*—David Osborn
*Attorney, Agent, or Firm*—Norman E. Brunell

[57] ABSTRACT

A power connect safety and connection interlock system is shown for use with inverters and other DC loads (16) which include capacitor filter banks (14) at their DC inputs. A safety circuit (20) operates a spring (26) biased, solenoid (22) driven mechanical connection interference (24) which prevents mating and therefore electrical connection between the power contactor halves (11, 13) of the main power contacts (12) until the capacitor bank is safely precharged through auxiliary contacts (18). When the DC load (16) is shut down, the capacitor bank (14) is automatically discharged through a discharging power resistor (66) by a MOSFET transistor (60) through a discharging power resistor (66) only when both the main power contacts and auxiliary contacts are disconnected.

8 Claims, 1 Drawing Sheet

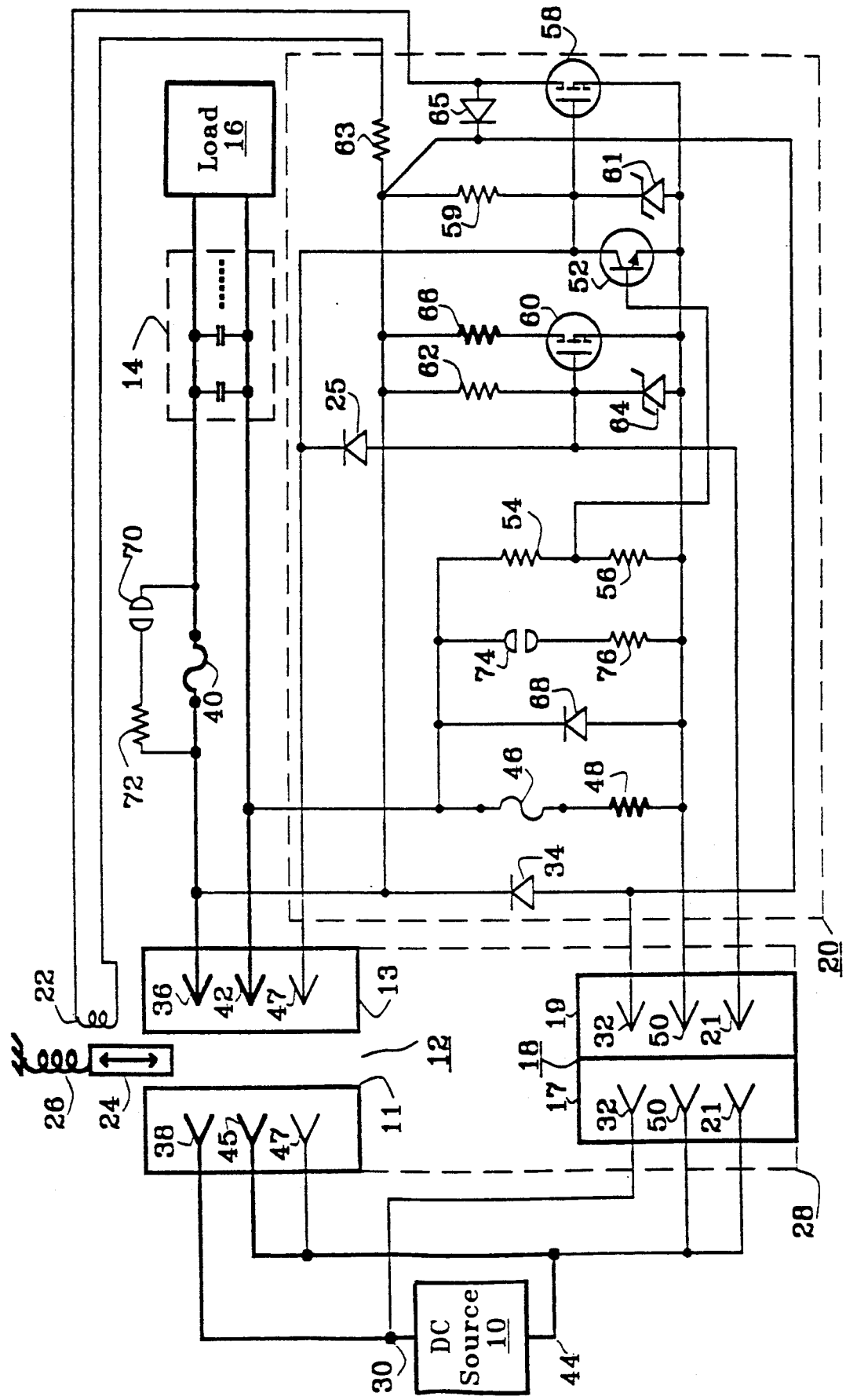

POWER CONNECT SAFETY AND CONNECTION INTERLOCK

POWER CONNECT SAFETY AND CONNECTION INTERLOCK

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates to inverters and other DC loads operating from DC power sources such as batteries. In particular, the present invention relates to such systems which include filter capacitor banks at the direct current inputs of the DC loads.

2. Description of the Prior Art

Conventional inverters, and other DC loads, often use large capacitor banks at their direct current (DO) inputs to filter out internal switching transients and noise. Capacitor banks are used to prevent these unwanted signals from appearing on the DC bus or in the batteries or other DC power source.

However, when such loads are connected to the DC bus, an excessive inrush of current can occur as the capacitors charge. This capacitor charging current may greatly exceed the normal operating current for the system and cause damage to the capacitors, cabling and/or connection devices if not limited. Current limiting devices, however, should not be allowed to interfere with the operating demands of the DC load.

Conventional DC loads with large input capacitor banks are therefore often precharged, when first connected to the DC power source, by means of auxiliary relays or contacts which connect the capacitor banks through current limiting devices. Thereafter, when the capacitor banks have been fully or almost fully charged, the DC bus is directly to the DC load, bypassing the current limiting devices.

Similarly, when the DC load is disconnected, auxiliary discharging devices are connected to safely remove the charge from the capacitor banks. In systems using high voltage DC power sources, such charges can present lethal voltages capable of persisting for relatively long durations, if not properly discharged.

Such conventional precharging and discharging systems, however, include auxiliary relays, contactors and other expensive components and tend to consume power and therefore reduce system performance. Mechanical portions of such components tend to have short operating lives and can hang up and refuse to connect or disconnect. These problems substantially reduce system reliability and present important safety problems for the operation of such systems.

A fail-safe technique is required which permits mating of the main power contacts only after the capacitor bank charging has been safely accomplished and which automatically and reliably discharges the capacitor bank when and only when the main and auxiliary connections have been broken.

SUMMARY OF THE INVENTION

The preceding and other shortcomings of the prior art are addressed and overcome by the present invention that provides, in a first aspect, a power interconnection system for connecting a DC power source to a capacitor bank at the input of a DC load with a pair of power contact halves connectable between the DC power source and the capacitor bank, a safety circuit for precharging the capacitor bank, and mechanical interference responsive to the safety circuit for selectively preventing electrical connection through the power contact halves until the capacitor bank has been safely precharged.

In a further aspect, the invention provides auxiliary contacts for connecting the safety circuit to the DC power source and a discharging circuit for selectively draining any excess charge from the capacitor bank only when both the power contact halves and the auxiliary contacts are disconnected.

In another aspect, the invention provides a method of connecting a DC power source to a capacitor bank at the input of a DC load by connecting a safety circuit to the DC power source for precharging the capacitor bank, and mechanically interfering with the mating of a pair of power contact halves connectable between the DC power source and the capacitor bank for selectively preventing electrical connection through the power contact halves until the capacitor bank has been safely precharged.

In a still further aspect, the invention provides a method of connecting the safety circuit to the DC power source through auxiliary contacts and discharging any excess charge from the capacitor bank only when both the power contact halves and the auxiliary contacts are disconnected.

The foregoing and additional features and advantages of this invention will become further apparent from the detailed description and accompanying drawing FIGURE that follow. In the FIGURE and written description, numerals indicate the various features of the invention, like numerals referring to like features throughout both the drawing FIGURE and the written description.

BRIEF DESCRIPTION OF THE DRAWING

The FIGURE is a mechanical and electrical schematic o a power connect safety and connection interlock system according to the present invention.

DETAILED DESCRIPTION OF THE PREFERRED EMBODIMENT

In accordance with the present invention, a battery stack or other DC power source 10 is connected through main power contacts 12 to capacitor bank 14 at the DC input to an AC inverter or other DC load 16. Auxiliary contacts 18, which may physically be part of or separate from main power contacts 12, connect DC power source 10 to safety circuit 20. Safety circuit 20 operates solenoid 22 to selectively actuate mechanical connection interference 24 to permit or prevent the mating of main power contacts 12.

Mechanical connection interference 24 is spring loaded by spring system 26 into a position, as shown in the FIGURE, which prevents mating of power contact halves 11 and 13 of main power contacts 12. Actuation of mechanical connection interference 24 by solenoid 22 under the control of safety circuit 20 is required to permit mating of main power contact halves 11 and 13 to electrically connect DC power source 10 to capacitor bank 14 and therefore to DC load 16.

The required mechanical configuration of main power contacts 12 and mechanical connection interference 24 depend upon the particular application to which the present invention is applied. Mechanical connection interference 24 may conveniently be a spring loaded plunger which projects between contact halves 11 and 13 to mechanically interfere with electrical connection by preventing the mating of contact halves 11 and 13, or mechanical connection interference 24 may be any other mechanical interference, suitable for the application, which positively prevents electrical connection unless solenoid 22 is actuated.

The configuration shown in the FIGURE, in which solenoid is not actuated and therefore main power contacts 12 are prevented from mating so that DC power source 10 is not connected to DC load 16, is the normal condition when DC load 16 is in the OFF state. In this configuration mechanical connection interference 24 physically prevents mating of contact halves 11 and 13.

In order to safely operate DC load 16 into the ON state, it is necessary to first precharge or "soft" charge capacitor bank 14.

Such precharging of capacitor bank 14 is accomplished by electrical interconnection of auxiliary contact halves 17 and 19 to form auxiliary contacts 18. As noted above, auxiliary contacts 18 may be physically separate from main power contacts 12 or part of the same physical housing. If main power contacts 12 and auxiliary contacts 18 are physically separate from each other, that is, if they are part of two separate connectors, it does not matter in which order they are physically connected because mechanical connection interference 24 prevents mating of main power contact halves 11 and 13 until actuation of mechanical connection interference 24 by operation of solenoid 22.

If main power contacts 12 and auxiliary contacts 18 are physically separate, operation of diode 25, discussed below, prevents discharge of capacitor bank 14 while either contacts are connected. Therefore, it does not matter in which order the contacts are disconnected, because discharge cannot occur until both sets of contacts are disconnected.

If main power contacts 12 and auxiliary contacts 18 are part of the same physical unit, shown in the FIGURE as connector housing 28, mating of the two halves of connector housing 28 provides electrical connection of only auxiliary contacts 18 until actuation of mechanical connection interference 24 by operation of solenoid 22. Thereafter, disconnection of connector housing 28 disconnects both main power contacts 12 and auxiliary contacts 18 at the same time so discharge of capacitor bank 14 can only ocur when both sets of contacts are disconnected. In this configuration, diode 25 may be eliminated.

When auxiliary contacts 18 are first mated to begin the precharging cycle, a limited charging current will flow from positive DC power source terminal 30 through contacts 32 of auxiliary contacts 18 and diode 34 in safety circuit 20 to male contact 36 in male power connector half 13 of main power contacts 12. As shown in the FIGURE, mechanical connection interference 24 prevents electrical operation of main power contacts 12 so that male contact 36 is prevented from electrical contact with female contact 38 in female power contact half 11 thereby preventing direct connection between positive DC power source terminal 30 and capacitor bank 14.

The limited charging current through diode 34 flows into capacitor bank 14 through main fuse 40. The other side of capacitor bank 14 is connected to male ground contact 42 in male power connector half 13 which is prevented from electrical contact with female contact 45 in female power contact half 11, and therefore with negative DC power source terminal 44, by mechanical connection interference 24. The limited charging current therefore flows from male ground contact 42 only through chrging fuse 46 and current limiting resistor 48 to contacts 50 in auxiliary contacts 18 which provide electrical connection to negative DC power source terminal 44. The charging time constant is equal to the product of the capacitance of capacitor bank 14 and resistance of current limiting resistor 48.

During the precharge cycle, a portion of the voltage appearing across current limiting resistor 48 is applied to the base of transistor 52 through the center tap of the voltage divider formed by resistors 54 and 56. This biases transistor 52 on which, in turn, holds transistor 58 off, preventing actuation of solenoid 22. During this precharging cycle, solenoid 22 cannot be actuated and therefore mechanical connection interference 24 serves to prevent electrical connection through main power contacts 12.

However, as capacitor bank 14 becomes charged during the precharging cycle, the voltage applied to the base of transistor 52 is reduced until transistor 52 is turned off. The transition point is controlled by the ratio of the values of resistors 54 and 56. When transistor 52 stops conducting, transistor 58 is turned on via pull up resistor 59 which raises the gate voltage to a value set by Zener diode 61. Solenoid 22 is then powered through current limiting resistor 63. Clamp diode 65 serves to limit the voltage across transistor 58 and prevent damage from any voltage spikes from solenoid 22 when the solenoid is de-energized.

Actuation of solenoid 22 withdraws mechanical connection interference 24 from main power contacts 12 permitting mating and electrical connection between power contact halves 11 and 13. If main power contacts 12 are mounted within connector housing 28, the electrical connection may be made without mechanical interference. If not, actuation of solenoid 22 permits the separate manual mating and connection of main power contacts 12.

After DC load 16 is turned to the OFF state and shut down, main power contacts 12 and auxiliary contacts 18 may be disconnected. When both sets of contacts have been disconnected, voltage across capacitor bank 14 maintains transistor 60 in the ON or conducting state via pull-up resistor 62 to the gate voltage set by the value of Zener diode 64. Transistor 60 draws current through discharging power resistor 66, discharging capacitor bank 14 through discharging power resistor 66 and diode 68.

As noted above, if main power contacts 12 and auxiliary contacts is are not part of the same physical housing such as connector housing 28, diode 25 serves to prevent discharge of capacitor bank 14 until both main power contacts 12 and auxiliary contacts 18 are disconnected. For example, if main power contacts 12 have been disconnected, but auxiliary contacts 18 are still connected, contacts 21 prevent discharge. In particular, the gate of transistor 60 is clamped to negative DC power source terminal 44 through contacts 21 within auxiliary contacts 18 thereby keeping transistor 60 off and preventing discharge of capacitor bank 14 through discharging power resistor 66. Similarly, if auxiliary contacts 18 have been disconnected, but main power contacts 12 are still connected, diode 25 clamps the gate of transistor 60 to negative DC power source terminal 44 through contacts 47 in main power contacts 12, thus preventing discharge.

Safety circuit 20 provides additional safety and convenience features. If main fuse 40 is blown, full battery voltage from DC power source 10 will appear across main fuse 40 illuminating lamp 70 at any attempt to connect main power contacts 12 and or auxiliary contacts 18. The current through lamp 70 may be controlled by limiting resistor 72. Similarly, if a fault or overload occurs across the DC input bus, and main fuse 40 does not blow, connection of auxiliary contacts 18 will cause a constant current to flow through charging fuse 46.

Charging fuse 46 may conveniently be sized so that, for the application in which it is used, the prolonged constant current due to a fault will melt charging fuse 46 and thereby illuminate lamp 74. The current through lamp 74 may be controlled by limiting resistor 76.

Transistors 58 and 60 are shown as MOSFET transistors while transistor 52 is shown as a bipolar transistor, for convenience. In this configuration, these types of transistors provide operating efficiency, but many other circuit variations could be used within the scope of this invention.

While this invention has been described with reference to its presently preferred embodiments, its scope is not limited thereto. Rather, such scope is only limited in so far as defined by the following set of claims and includes all equivalents thereof.

What is claimed is:

1. A power interconnection system for connecting a DC power source to a capacitor bank at the input of a DC load, comprising:
   a pair of power contact halves connectable between the DC power source and the capacitor bank;
   a safety circuit for precharging the capacitor bank; and
   mechanical interference responsive to the safety circuit for selectively preventing electrical connection through the power contact halves until the capacitor bank has been safely precharged.

2. The power interconnection system claimed in claim 1 further comprising:
   spring means for urging the mechanical interference into a first position preventing electrical connection through the contact halves, and
   solenoid means responsive to the safety circuit for urging the mechanical interference into a second position permitting electrical connection through the power contact halves when the capacitor bank has been safely precharged.

3. The power interconnection system claimed in claim 2 wherein the safety circuit urges the mechanical interference into the second position when the charge on the capacitor bank reaches a predetermined level.

4. The power interconnection system claimed in claim 2 wherein the safety circuit further comprises:
   auxiliary contact for connecting the safety circuit to the DC power source;
   a discharging circuit for selectively discharging the capacitor bank only when both the power contact halves and the auxiliary contacts are disconnected.

5. A method of connecting a DC power source to a capacitor bank at the input of a DC load, comprising the steps of:
   connecting a safety circuit to the DC power source for precharging the capacitor bank; and
   mechanically interfering with the mating of a pair of power contact halves connectable between the DC power source and the capacitor bank for selectively preventing electrical connection through the power contact halves until the capacitor bank has been safely precharged.

6. The method claimed in claim 5 wherein the mechanical interference steps further comprise the step of:
   removing the mechanical interference when the capacitor bank has been safely precharged.

7. The method claimed in claim 6 wherein the mechanical interference is removed when the charge on the capacitor bank reaches a predetermined level.

8. The method claimed in claim 6 wherein the safety circuit step further comprises the steps of:
   connecting the safety circuit to the DC power source through auxiliary contacts; and
   discharging the capacitor bank only when both the power contact halves and the auxiliary contacts are disconnected.

* * * * *

UNITED STATES PATENT AND TRADEMARK OFFICE
CERTIFICATE OF CORRECTION

| | | |
|---|---|---|
| PATENT NO. : | 5,099,187 | |
| DATED : | Mar. 24, 1992 | |
| INVENTOR(S) : | Wally E. Rippel | |

It is certified that error appears in the above-identified patent and that said Letters Patent is hereby corrected as shown below:

| | | |
|---|---|---|
| COL. 1 | LINE 21 | After --direct current-- replace "(DO)" with "(DC)"; |
| COL. 2 | LINE 42 | After --matic-- delete "o" and insert "of"; |
| COL. 3 | LINE 11 | After --solenoid-- insert "22"; |
| COL. 4 | LINE 7 | After --through-- correct spelling of "charging"; |
| COL. 4 | LINE 55 | After --contacts-- replace "is" with "18"; |
| COL. 6 | LINE 15 | After --auxiliary-- replace "contact" with "contacts". |

Signed and Sealed this

Seventeenth Day of August, 1993

Attest:

Attesting Officer

BRUCE LEHMAN

Commissioner of Patents and Trademarks